(12) United States Patent
Jones

(10) Patent No.: US 6,594,007 B2
(45) Date of Patent: Jul. 15, 2003

(54) METHOD AND APPARATUS FOR MAPPING SYSTEM CALIBRATION

(75) Inventor: Barbara L. Jones, King's Lynn (GB)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/005,288

(22) Filed: Dec. 7, 2001

(65) Prior Publication Data

US 2002/0131039 A1 Sep. 19, 2002

(30) Foreign Application Priority Data

Feb. 1, 2001 (GB) .............................. 0102651
Feb. 5, 2001 (GB) .............................. 0102779

(51) Int. Cl.[7] .................... G01B 11/26; G01C 1/00; G01C 17/00; G01C 19/00; G01C 9/00; G06F 15/00

(52) U.S. Cl. .................... 356/139.03; 356/152.1; 702/152

(58) Field of Search .................... 356/139.03, 152.1; 702/40, 94, 95, 150, 151, 152

(56) References Cited

U.S. PATENT DOCUMENTS

| | | | |
|---|---|---|---|
| 4,559,524 A | 12/1985 | Suzuki | |
| 4,811,250 A | 3/1989 | Steber et al. | |
| 4,834,531 A * | 5/1989 | Ward .......................... | 356/5.08 |
| 4,965,586 A | 10/1990 | O'Neill et al. | |
| 5,177,563 A | 1/1993 | Everett et al. | |
| 5,221,928 A | 6/1993 | Dahl | |
| 5,270,539 A | 12/1993 | Ito et al. | |
| 5,337,149 A * | 8/1994 | Kozah et al. ............... | 356/601 |
| 5,379,045 A | 1/1995 | Gilbert et al. | |
| 5,473,424 A * | 12/1995 | Okumura ................ | 356/139.03 |
| 5,816,096 A | 10/1998 | Ng et al. | |
| 5,822,486 A | 10/1998 | Svetkoff et al. | |
| 5,828,336 A | 10/1998 | Yunck et al. | |
| 5,835,209 A * | 11/1998 | Umeda et al. ........... | 356/141.3 |
| 5,940,170 A | 8/1999 | Berg et al. | |
| 5,949,529 A | 9/1999 | Dunne et al. | |
| 5,973,788 A | 10/1999 | Petersen et al. | |
| 5,977,913 A | 11/1999 | Christ | |
| 5,982,549 A | 11/1999 | Kubala et al. | |
| 6,025,726 A | 2/2000 | Gershenfeld et al. | |
| 6,114,990 A | 9/2000 | Berljung et al. | |
| 6,147,760 A | 11/2000 | Geng | |
| 6,176,837 B1 | 1/2001 | Foxlin | |
| 6,266,142 B1 * | 7/2001 | Junkins et al. ............... | 356/623 |
| 6,424,410 B1 * | 7/2002 | Pelosi .................... | 356/139.03 |

FOREIGN PATENT DOCUMENTS

| | | |
|---|---|---|
| GB | 2 349 953 A | 11/2000 |
| WO | WO 98/11405 | 3/1998 |
| WO | WO 98/12503 | 3/1998 |

* cited by examiner

Primary Examiner—Thomas H. Tarcza
Assistant Examiner—Brian K Andrea
(74) Attorney, Agent, or Firm—Seyfarth Shaw

(57) ABSTRACT

Method and apparatus for calibration of 3-dimensional mapping systems applicable to automotive crash repair and diagnostics in which a calibration assembly provides accurate 3-dimensional optical inputs to a camera unit for calibration of the internal dimensional constants of the unit. The 3-dimensional calibration apparatus employs twin spaced mounting planes for patterns of optical emitters at known spacings and dispositions from the fixed camera unit position whereby tight tolerances in manufacture and assembly enable the apparatus to be more compact than a typical work piece to be mapped.

25 Claims, 6 Drawing Sheets

METHOD AND APPARATUS FOR MAPPING SYSTEM CALIBRATION

BACKGROUND

This application relates to a method and apparatus for mapping system calibration. An example of the application of the method is to a three-dimensional mapping system for determining the coordinates in space of identifiable locations on a crashed automotive vehicle. Specific embodiments described below relate to an optical system for three-dimensional automotive vehicle mapping and diagnostics operations. Certain of the broader aspects may be applicable to mapping systems (particularly but not exclusively for automotive diagnostic and repair work) utilizing other energy sources than optical energy.

Existing techniques for the calibration of equipment used in relation to dimensional and coordinate mapping and the like operations tend to be based on the obviously applicable technique of carrying out a series of dimensional mapping steps using known dimensional data (whereas in future use of the equipment that dimensional data will be to be determined), so that the unknown parameters, perhaps in relation to the equipment itself, can be accurately determined.

Thus, in relation to optical camera equipment, typically the technique is employed of using the optical equipment in a manner corresponding generally closely to that which will be employed when using the equipment in the field, and identifying the coordinates of a series of calibration locations by means of a calibration measurement machine (CMM).

Such a technique is somewhat laborious and slow and expensive as a basis for calibration of cameras on a production line, as is required. The step by step procedure is obviously slow. The technique also requires a substantial amount of space, since the calibration locations need to be, generally speaking, disposed at least as far from the camera as will occur in use, and preferably further, in order to enhance the accuracy of the determination. Thus, the technique is relatively slow, relatively costly and relatively inconvenient. An example of a published disclosure relating to in-field calibration of dimensional measuring equipment (applicable to vehicle wheel alignment) is disclosed in WO 08/12503 (Snap-on Technologies Inc). This technique utilizes for calibration purposes moveable targets which are disposable in either of two calibration positions for use in a sequential calibration process.

SUMMARY

An important aspect is to provide a method and apparatus particularly adapted to the calibration of optical and other mapping systems offering improvements relative to one or more of the matters discussed above, or generally.

Specifically in the embodiments, there are disclosed methods and apparatus for accurately determining the dimensional and locational parameters of certain critical internal components of a camera system employed in an optical measurement system used in three-dimensional automotive mapping. In these embodiments, the optical camera apparatus which is to be calibrated is itself manufactured to a relatively very high standard of constructional quality or accuracy, and accordingly the internal dimensions and locational parameters are, in principle, accurately known on the basis of the dimensional data relating to the components used and the assembly techniques employed. These dimensional parameters are, however, only nominal and do not provide a sufficiently accurate basis to be used as the dimensional starting point for calculating the coordinates of points to be mapped, in view of the relatively large distances between the camera and the points to be mapped, as compared with the internal camera dimensions under consideration.

In the embodiments described below it is disclosed that the techniques concerned enable the calculation of the relevant internal camera dimensional and locational data for three critical parameters of the camera. In its specific aspects, the invention is well-adapted to enable such data to be calculated. In its broader aspects, the invention provides a basis for very accurate calibration of mapping apparatus without the necessity for, in all cases, the calculation of the specific internal camera dimensions discussed in relation to the described embodiments.

In embodiments described below the method and apparatus is well adapted for use by way of calibrating production line equipment on a rapid and convenient basis and without adopting the step-by-step approach which has been necessary in relation to the use of CMM machines as described above. Moreover, in the embodiments described below, the apparatus described is constructed so that, and the corresponding method employs the apparatus so that, the dimensional and locational accuracy which can be readily built into the apparatus (of which only one example may be needed for a camera production line), is built into the apparatus and inherently controls the accuracy of the resultant calibration steps.

Thus, in the embodiments described below, we provide the means whereby optical camera apparatus forming part of a three-dimensional mapping system can be readily mounted in relation to the calibration apparatus at a location in which its dimensional position is very accurately known in relation to the relevant parts of the remainder of the apparatus. Then, the apparatus can be employed to provide simultaneously to the camera system energy signals from precisely known dimensional and locationally determined points so that (since these coordinates are known), the internal dimensions and locational data relating to the camera can be determined. Moreover, since the apparatus is extremely simple in construction its cost is relatively low. Also, since the apparatus is itself easily constructed to standards of dimensional accuracy which are better than those required for the mapping procedure itself, the overall dimensions of the apparatus can be significantly smaller than those of the typical three-dimensional article (such as an automobile) to be mapped.

In the embodiments, the energy source for calibration of the camera is a series of light-emitting diodes which are mounted on a pair of planar supports or mounting planes which are themselves disposed at spaced apart positions, one in front of the other and both in front of the camera unit.

By this arrangement, there is provided, conveniently, an accurately constructed three-dimensional array of energy sources which are precisely positioned and defined with respect to the camera unit, the latter being mounted at a fixed central front location with respect to the mounting planes and being connected thereto at a fixed distance by the structure of the apparatus, constituting spacer means.

Thus by adopting a simple mechanical structure providing merely a mounting for the camera module and connection means therefrom to a pair of mounting planes of simple planar construction and supporting, in each case, an array of energy sources, there is provided a simple and relatively cost effective mechanical means for effecting in a largely simultaneous manner the series of steps which have hitherto been necessary to take using CMM apparatus. Moreover, the simple mechanical structure of the apparatus enables the above-discussed provision of accuracy of dimensional construction enabling minimization of space requirements.

An important aspect of the embodiments relates to the simplicity of construction arising from the ability to transmit and receive energy signals between the transmitting and receiving energy modules despite the adoption of a simple mechanical construction in which the mounting planes are disposed one in front of the other, with one of these between the other and the camera.

The adoption of mounting planes, for example in form of boards or like rigid constructions, in the embodiments enables the precision location and position definition needed for the purposes of the system, without significant cost. However, such construction leads to the need either for an arrangement in which the energy signal can pass around the nearer board in order to reach the camera from the remote board, or else, some other arrangement is needed.

In order to allow for the energy signal to pass around the intermediate board, the space implications of the construction would be significant, and such would remove the above-discussed advantage (in terms of space saving) arising from the (effectively) rigid one-piece construction. By the adoption of an arrangement in which window means is provided in the front board and which is penetrable by the transmitted energy signal, and functions as described below, this potential loss of a significant advantage is avoided.

As to the window means itself, this is constructed so as to provide firstly the means for permitting the onward transmission of the relevant energy signal so as to permit same to be received and analyzed and its positional data to be processed. For energy transmission purposes, the embodiments provide openings in the forward one of the mounting boards or planes, these openings being positioned in accordance with the principles identified below. Alternatively, the air-gap window openings could be replaced by the provision of energy-permeable (in relation to the relevant wavelength) window elements if such were beneficial for a practical purpose connected with the calibration procedure. However, in the controlled environment of the testing location, such is unlikely to be required.

As to the size and position of the window openings in the forward one of the mounting planes, these are chosen on the basis of providing a direct optical path from the individual energy sources to the camera module, taking account of the exact position of the latter, and the angular implications of such. Accordingly, the window openings are generally arranged in a pattern (of openings) formed in the forward mounting plane and corresponding generally to the distribution pattern of the energy emitters on the rearward mounting plane. As to the size of the openings, these are generally a matter of design convenience in accordance with the foregoing principles.

BRIEF DESCRIPTION OF THE DRAWINGS

Embodiments will now be described by way of example with reference to the accompanying drawings in which.

DETAILED DESCRIPTION

Figure 2:
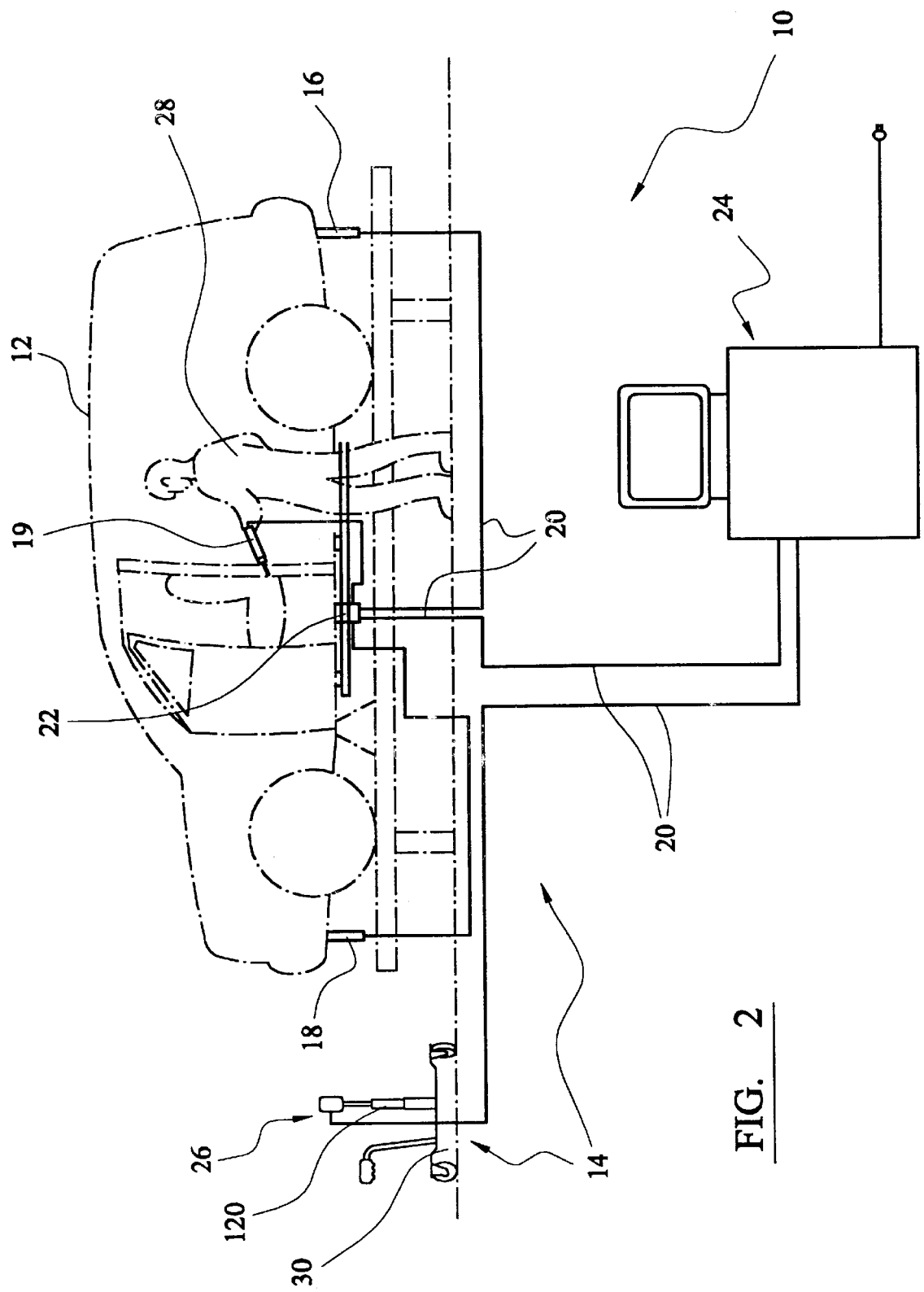
FIG. 2 is a side elevational view of a 3-dimensional coordinate determination mapping system for automotive crash repair as disclosed in the prior-published WO98/11405 specification, and showing an automotive vehicle mounted on a hoist and having mounted thereon transmitter means which are disposed within good communication distance of corresponding receiver means provided by the camera unit of FIG. 1 together with two associated camera units, and the apparatus being connected to data processing means.

As shown in FIG. 2, apparatus 10 for 3-dimensional coordinate determination for crash repair and diagnostics in relation to an automotive vehicle 12, comprises coordinate data evaluation apparatus 14 including transmitter means 16, 18, 19 connected via signal transmission lines 20 and connector junction 22 to data processing means 24 adapted to process data derived from the transmission of an energy signal between said transmitter means 16, 18, 19 and corresponding receiver means 26 to determine information with respect to the 3-dimensional coordinates of one, 19, of the transmitter means. Transmitter means 19 is used by an operator 28 in wand fashion to identify locations on vehicle 12 of which the 3-dimensional coordinates are to be mapped.

Apparatus 10 as thus-far described is of published construction and operates, for mapping purposes generally as described below. Transmitter means 16, 18 and 19 emit energy signals in the optical range, for example by means of light-emitting diodes, and these signals are received by receiver means 26 mounted on a trolley 30 at a fixed position. Data relating to the positions of the transmitters is conveyed to data processing means 24 and, by virtue of data-processing steps based on geometric triangulation, the coordinates of the locations of transmitters 16, 18 and 19 can be determined, point 19 being, at any time, one of a large series of points which operator 28 is required to 3-dimensionally map. At least one of the transmitters 16 or 18 is, in the case of a damaged vehicle, located at a reference point, for example an undamaged vehicle location, so as to provide a reference basis for coordination of the mapping operation with the vehicle manufacturer's own mapping data.

Having thus outlined the main features of the method and apparatus as a whole, when used in its intended (non-calibration) field use manner, we now turn to the construction of receiver means with the calibration of which the present application is principally concerned. It is to be understood that, although in this embodiment, camera or receiver means 26 is calibrated using the principles described, in an alternative embodiment the calibration principles can be applied where the energy signal transmission direction is reversed, though such modification might require a different energy signal.

Receiver means 26 of FIG. 2 may be a camera including three energy signal sensing modules or camera units (one shown) adapted to receive an optical energy signal and adapted to be mounted at defined positions spaced apart lengthwise of a mounting beam (not shown but disclosed in the aforementioned WO 08/11405), such spacing being a known parameter for the data processing steps carried out by data processing means 24.

Figure 1:
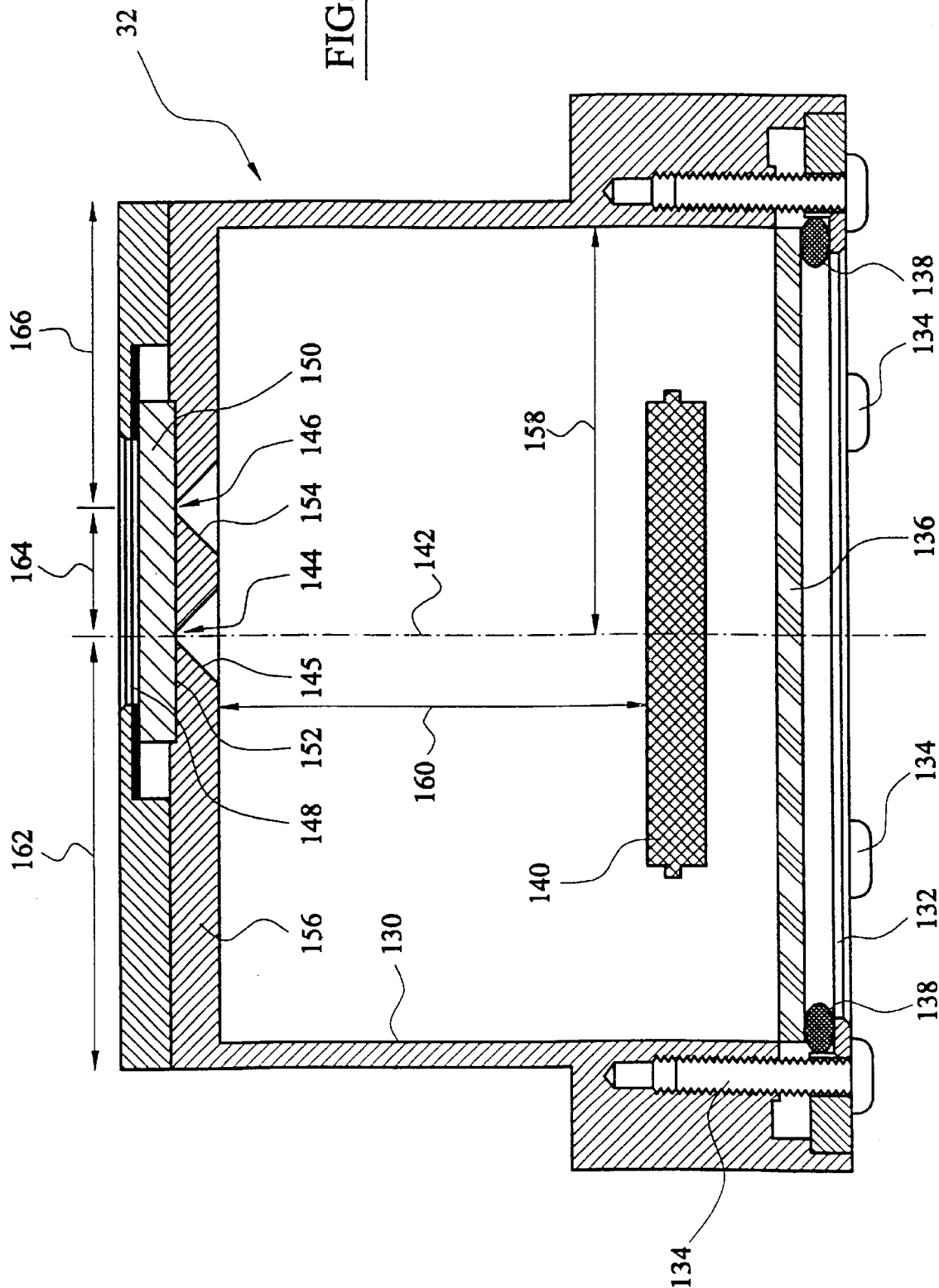
FIG. 1 is a sectional view through a camera unit or module taken in a plane transverse to the camera unit's parallel energy admission slits and disposed generally vertically and centrally of the camera unit.

One of camera units 32 is shown in FIG. 1, and each camera unit includes a machined, cylindrical, drum-like housing 130 having a circular clamping plate 132 retained by a ring of threaded fasteners 134. A printed circuit board 136 is retained by clamping plate 132 and associated O-rings 138 in association with the light-sensitive charge-coupled device (ccd) array 140, which provides an output signal which is fed via printed circuit board 136 to signal transmission lines 20 and data processing means 24. The ccd array is mounted accurately on the camera unit center line 142, and is likewise centered thereon. The center line 142 passes concentrically through one of two energy-admitting slits 144, 146. Ccd array 140 is accurately mounted at its indicated location in relation to the structure of the camera unit housing 130. Light enters the camera unit 32 through an opening 148 in the end of the module, and passes through a glass filter 150 and hence to the slits 144, 146 formed in a rectangle of thin foil 152 and aligned with V-slots 154 provided in the end wall 156 of housing 130. Operation of the system has already been generally described.

Critical design distances in camera unit 32 are indicated (inter alia) at 158, 160, 162, 164 and 166. This dimensional data is to be calibrated to provide accurate dimensional data for processing means 24, together with the signals provided via transmission lines 20, whereby mapping of the desired vehicle locations can be carried out for diagnostic and/or repair purposes.

Figure 3:
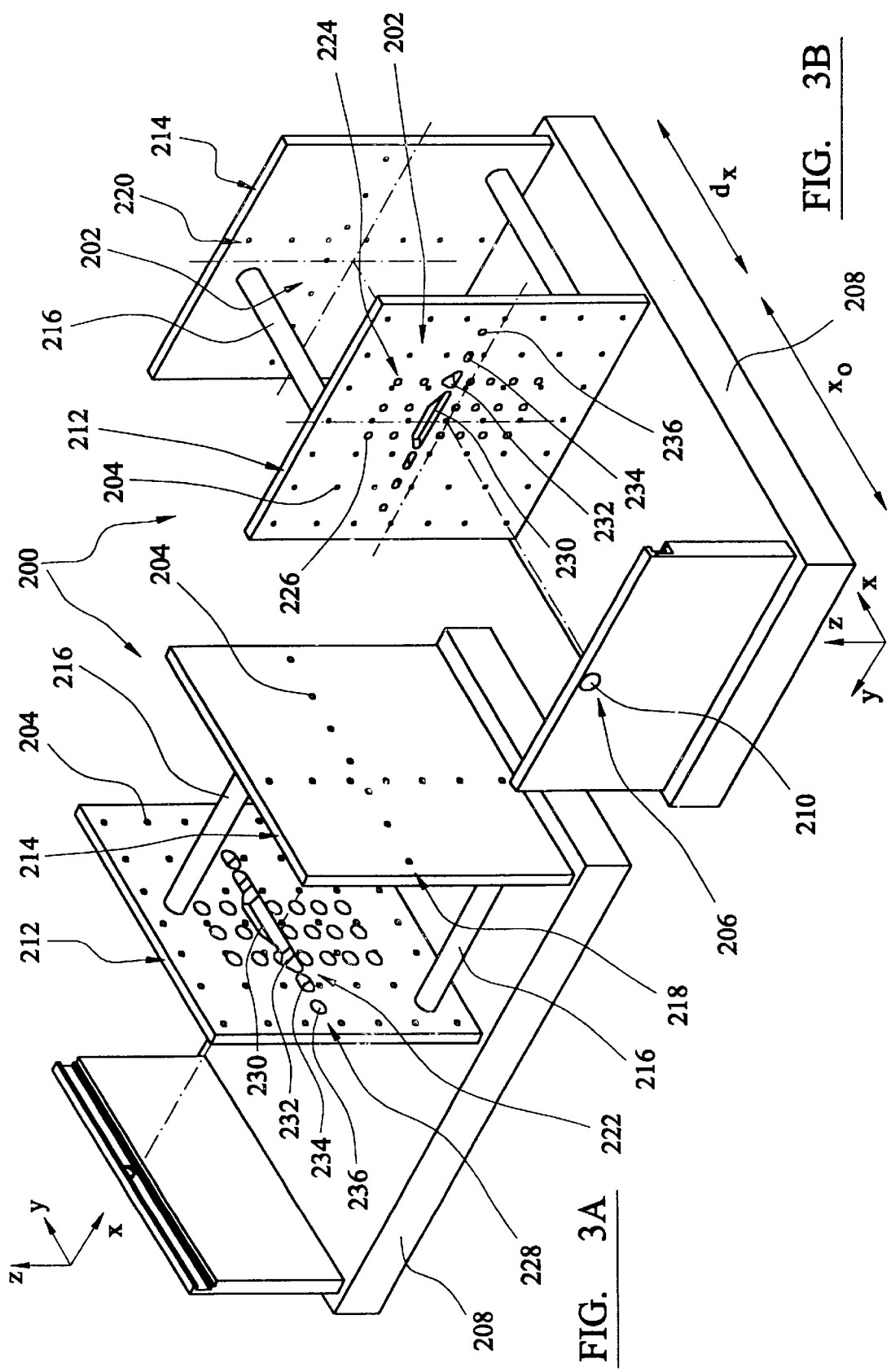
FIG. 3A is a rear perspective view of calibration apparatus for the system of FIG. 2.
FIG. 3B shows a front perspective view of the apparatus of FIG. 3A.

Having considered the general mode of operation of apparatus 10 for 3-dimensional coordinate determination in its field use mode as a basis for reference, we turn now to calibration aspects of the use of the system. Before the calibration process, the general arrangement of the apparatus 10 is modified from that which is shown in FIG. 2. The latter has been provided in order to show the general mode of use of such apparatus. Referring to FIGS. 3A and 3B, for calibration purposes, each of the three camera units 32 of receiver means 26 is individually calibrated, one at a time, such calibration being effected by use of calibration apparatus 200, and the camera unit being located at a fixed or known location relative to the locations of transmitters 204 throughout the data evaluation calibration steps.

Thus, turning to the actual construction of calibration apparatus 200, as shown in FIGS. 3A and 3B, the apparatus provides fixed and accurately-defined and precisely known locations at 206 for camera 32 and at known distances and spacings therefrom for transmitters 204. Apparatus 200 comprises a base 208 having supported thereon at fixed positions a camera unit mounting 210 and a first mounting plate 212 and a second mounting plate 214. The mounting plates serve to support the transmitters 204, as will be explained. Base 208 simply serves as an inextensible support structure for the camera unit mounting 210 and the first and second mounting plates 212, 214. Camera unit mounting 210 is a simple fixed structure which is dimensionally stable and provides a totally stable and accurately-defined camera unit support location 206 at which camera unit 32 can be mounted in a predetermined and precisely defined position.

First and second mounting plates 212, 214 are simple planar structures, likewise mounted at precisely defined positions and in parallel vertical attitudes on base 208 (but their positions and attitudes may be varied in relative and absolute terms provided the position data is known). They are constructed as dimensionally stable planar structures from natural or synthetic materials and their front surfaces (toward camera unit mounting 210) respectively define mounting planes. The structure is relatively unimportant, provided dimensional stability and accuracy of placement of the transmitters is available. To provide strength and rigidity and structural/dimensional stability there are provided between the first and second mounting plates 212, 214 three spacer rods 216 disposed at the corners of a triangle, as shown in FIGS. 3A and 3B.

Turning now to the array 202 of transmitters 204, these are disposed on plates 212, 214 in generally uniformly spaced relationship, in straight lines, the lines being disposed generally at right angles. On the front mounting plate 212 the transmitters 204 are disposed in a series of vertical and horizontal lines forming a rectangular block or grid of rows and columns of transmitters, whereas on the rear plate 214, the transmitters are disposed in a single horizontal line 218 and a single vertical line 220.

Window means 222 is provided in front mounting plate 212 to allow energy signal transmission through the front plate to camera unit 32. Window means 222 comprises a block 224 of three vertical rows of linearly-disposed apertures 226, together with a horizontal line 228 of larger apertures comprising a large central somewhat trapezoidal aperture 230 bounded by smaller apertures 232, 234, 236.

In use apparatus 200 and camera unit 32 are employed in association with data processing means 24 to establish the dimensional parameters of the camera unit 32 in accordance with matters discussed above, and utilizing the known position data relating to transmitters 204 on mounting plates 212, 214, as will be more fully described below.

Turning now to the details of the calibration process, the method essentially uses a static array of light sources or transmitters 204 to map pixel space (as read by camera unit 32) to angular space (positions to be mapped). The dimensional data determined in the calibration process provides a manufacturing diagnostic for each camera module or unit 32 because the relationship between the camera centroid position and its angular plane or disposition is determined separately for each camera module or unit.

In this embodiment, the variables to be determined in the calibration procedure are:

a) the distance from the slit (or lens) in camera unit 32 to the CCD array 140, this being done for each of the three camera modules individually. This is the distance 160 in FIG. 1.

b) the distance between the centers of the slits 144, 146, which distance is identified in FIG. 1 as 164; and c) the offset distance between the axis of the slit and the calibration origin of camera 32, defined by the "zero position transmitter" or light-emitting diode (LED) 204 in the apparatus 200.

These three sets of parameters can be calculated by combining positional data derived from the two static LED arrays provided by mounting plates 212 and 214, which are at a known spacing. It is implicit in this calculation that all LED 204 positions are known to a high degree of accuracy, namely better than 0.5 mm and preferably better than 0.05 mm, and that the assembly is mechanically stable (less than 0.01 mm movement) in the environment in which it is used.

Thus, calibration apparatus 200, comprising as it does the first and second mounting planes at the front surfaces of the mounting plates 212, 214 with their associated LED arrays of transmitters 204, these planes respectively, are positioned along the y-x plane (top surface of plate 208) at $x=x_0$ and $x=x_0+\delta x$. These two mounting planes define the calibration volume and, as mentioned above, the two plates 212, 214 are positioned to a high degree of accuracy, namely 0.5 mm and preferably 0.05 mm, and they must remain mechanically stable (movement less than 0.05 mm) and parallel throughout the measurement procedure. It will thus be appreciated that the procedure is preferably carried out in a thermally controlled enclosure.

Calibration of Distance from the Slit to the Ccd Array

Figure 4:
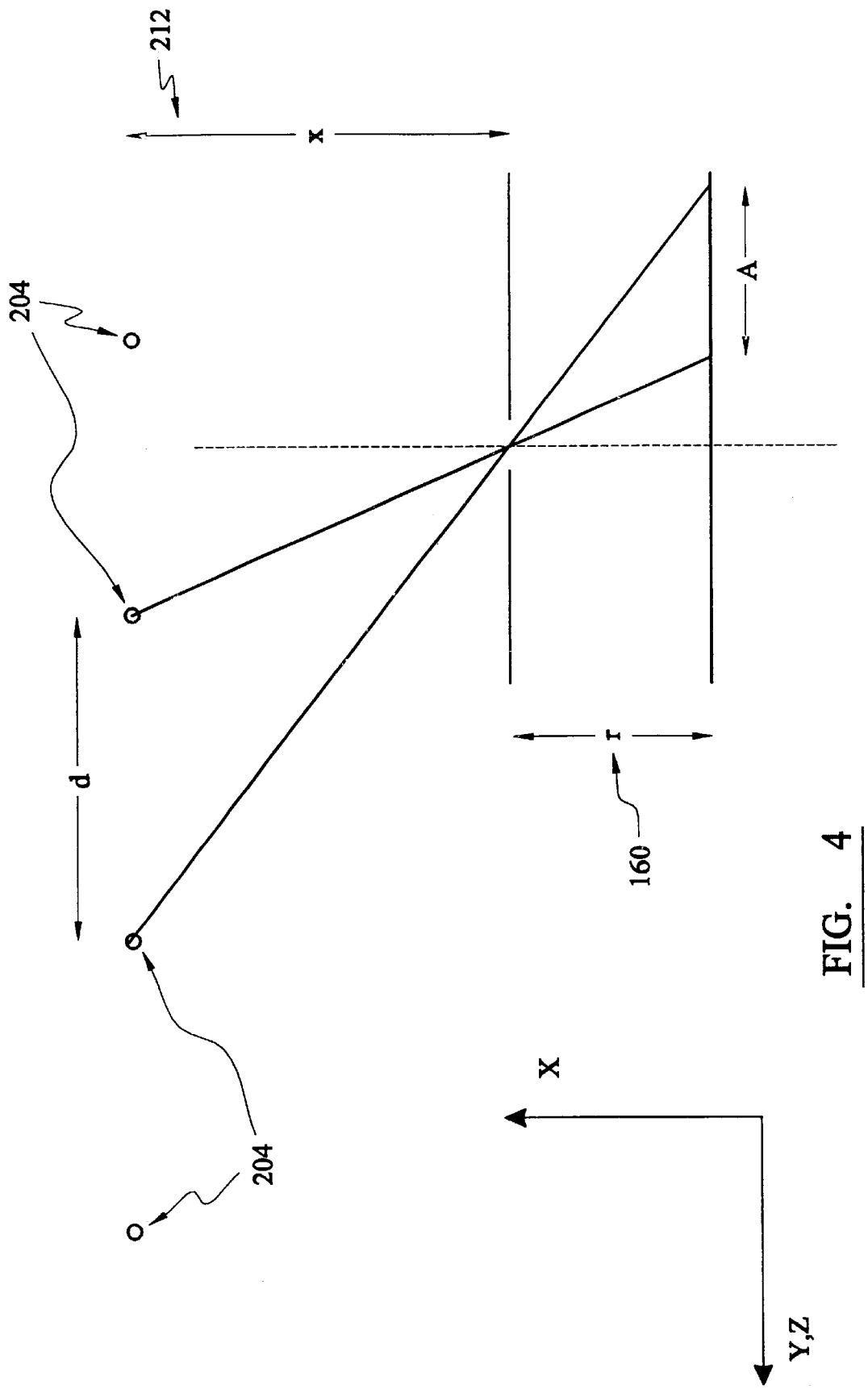
FIGS. 4, 5 and 6 show, diagrammatically, aspects of the dimensional data and calculations applicable to the calibration process using the apparatus of FIGS. 3A and 3B.

This value is nominally known for all three camera units 32, within the mechanical tolerances of the unit assemblies. However the present calibration procedure is intended to enable the determination of these distances by the following steps:

i) at known distance x (from the camera unit 32 to, e.g., the front surface of mounting plate 212) measure the separation of two LEDs 204 of known separation in the y axis direction (for two of the camera units 32 of receiver means 26) or in the z axis direction (for the other camera unit), depending upon the orientation of the slit in each camera unit 32;

ii) by use of a similar triangles procedure illustrated in FIG. 4, the distance r from the slit to the CCD array (indicated as 160 in FIG. 1) can be determined since x and d (the known horizontal or vertical separation of the LEDs 204 on the mounting plates 212, 214 see FIG. 4) are known and A is a camera unit reading of the imaged separation of the LEDs viewed, whereby r is given by the expression:

$$r = xA/d.$$

Since apparatus 200 provides two plates 212, 214 of LEDs, there are a number of combinations of LED pairs 204 separated by different distances which can be used in the above manner for this determination and thereby the results can be averaged for further accuracy.

Determination of Offset

Figure 5:
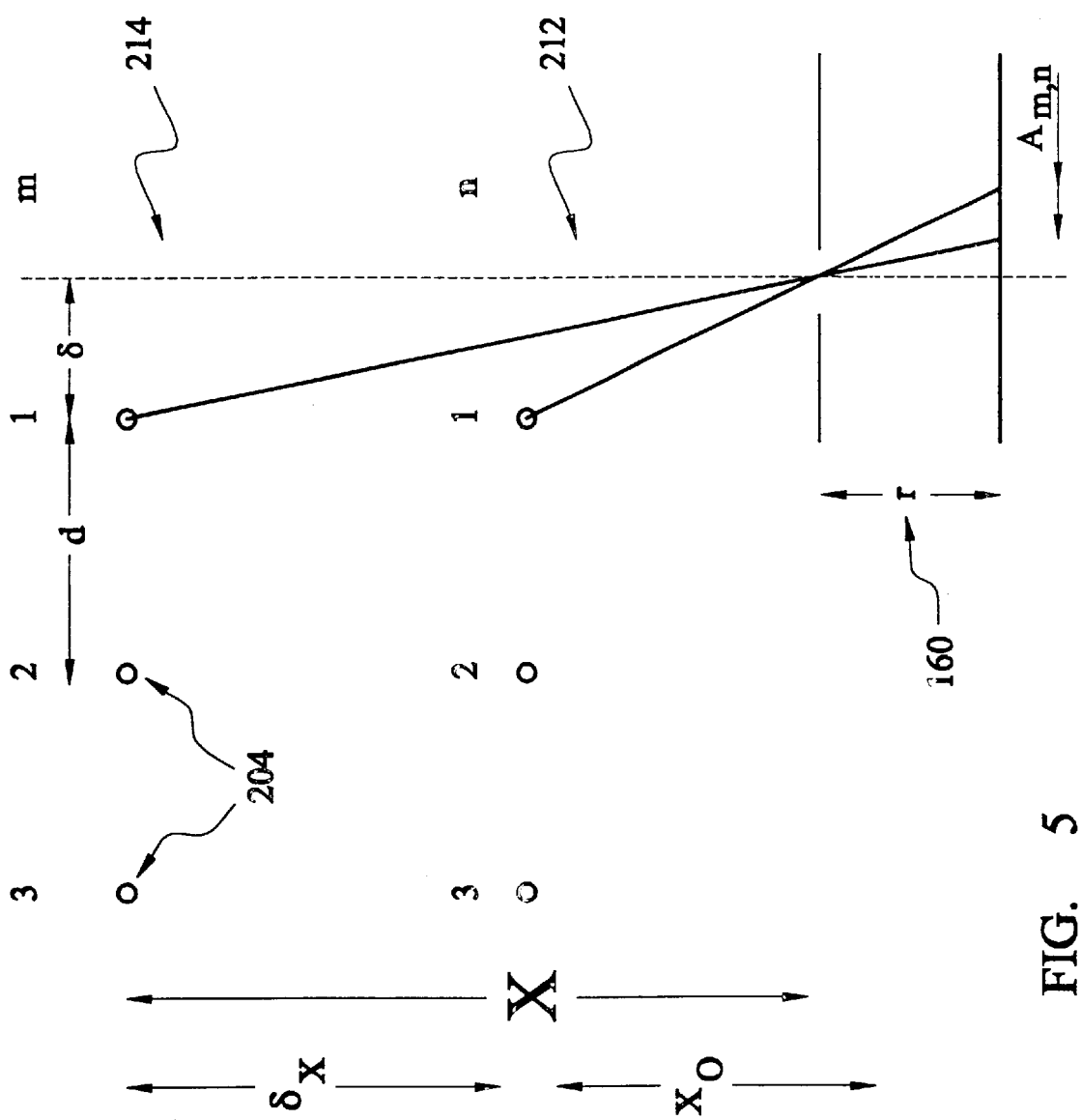

This procedure, illustrated in FIG. 5, determines the displacement $\delta^{A,B,C}$ in the y axis of the outermost LED position (for two of the three camera units 32, denoted as camera unites A, B, C) from the center of the slit for each of the particular camera units 32.

The displacement $\delta^{A,B,C}$ calculated using a single LED 204 from each of the first and second mounting plates 212, 214. If m and n refer to the $m^{th}$ LED in the back plate 124 and the $n^{th}$ LED in the front plate 212 and d is the LED pitch along the y and z axes then the displacement $\delta_{m,n}^{A,B,C}$ for one of the three camera units under calibration is given by Equation 1 herewith. In Equation (1) $r_A$ is the slit to CCD separation (i.e. distance 160) for a camera unit A, and $A_{m,n}$ is the distance separation in the $m^{th}$ and $n^{th}$ LED image positions imaged on the CCD array 150. As the latter quantity refers to distance, the read out will need to be converted from a pixel number recorded on the array 140.

$$\delta_{m,n}^A = \left\{ \frac{A_{n,m}}{r_A} - d\left[\frac{(n-1)}{x_0} - \frac{(m-1)}{x_0 + \delta_x}\right]\right\} \left\{\frac{1}{\frac{1}{x_0} - \frac{1}{x_0 + \delta_x}}\right\} \quad (1)$$

for $m, n = 1$ to $m_{max}, n_{max}$

Similarly the offset $\delta$ for each of the other two camera unites (B, C) can be determined using Equations 2 and 3 herewith.

$$\delta_{m,n}^B = \left\{ \frac{B_{n,m}}{r_B} - d\left[\frac{n}{x_0} - \frac{m}{x+\delta_x}\right]\right\} \left\{\frac{1}{\frac{1}{x_0} - \frac{1}{x_0 + \delta_x}}\right\} \quad (2)$$

for $m, n = \pm \frac{1}{2} m_{max}, n_{max}$ $$\delta_{m,n}^C = \left\{ \frac{C_{n,m}}{r_C} - d\left[\frac{n - n_{max}}{x_0} - \frac{m - m_{max}}{x_0 + \delta_x}\right]\right\} \left\{\frac{1}{\frac{1}{x_0} - \frac{1}{x_0 + \delta_x}}\right\} \quad (3)$$

for $m, n = 1$ to $m_{max}, n_{max}$,

For the central camera unit (e.g., B), the center LED of the plates 212, 214 is taken as the origin and the offset is measured in the z axis direction. For one of the other two camera units (e.g., C) the offset is measured in the y axis direction. Since the separation of the LEDs is known, the separation of the camera units A and C can be determined. The position of camera unit B denotes the z origin. The relative positions of the camera units A and C should have minimal effect on the accuracy of the calibrated system.

Average values of the offset $\delta$ can be determined which will allow for correction of systematic errors due to rotation of the camera unit about the z-axis. The effect of dispersion due to the glass filter on the front of the camera units 32 is not significant.

Angle Mapping and Slit Separation

Having determined the offset $\delta^{A,B,C}$ for each camera unit 32 (A, B, C), the pixel position of each LED in the front mounting plane 212 can be measured. Since the position of each camera unit 32 with respect to each LED 204 is known, the angle subtended by the LEDs 204 from each of the camera unit origins can be calculated and thus the camera calibration of pixels against angles can be determined in accordance with Equations 4, 5 and 6 herewith.

$$\theta_i^A = \tan^{-1}\left\{\frac{x_0}{(i-1)d + \delta_A}\right\} \text{ for } i = 1 \text{ to } i_{max} \quad (4)$$

$$\theta_j^B = \tan^{-1}\left\{\frac{jd + \delta_B}{x_0}\right\} \text{ for } j = \pm j_{max} \quad (5)$$

$$\theta_i^C = \tan^{-1}\left\{\frac{x_0}{2D - (i-1)d - \delta_A}\right\} \text{ for } i = 1 \text{ to } i_{max} \quad (6)$$

Where x, y, z are now calculated with an origin centered at the slit for camera unit A, and 2D which is the separation of the camera units A, C (i.e. outermost camera units) has been calculated from the known LED pitch d and offsets $\delta A$ and $\delta B$ (for camera units A and B) in terms of $2D = 6d + \delta A + \delta C$.

Figure 6:
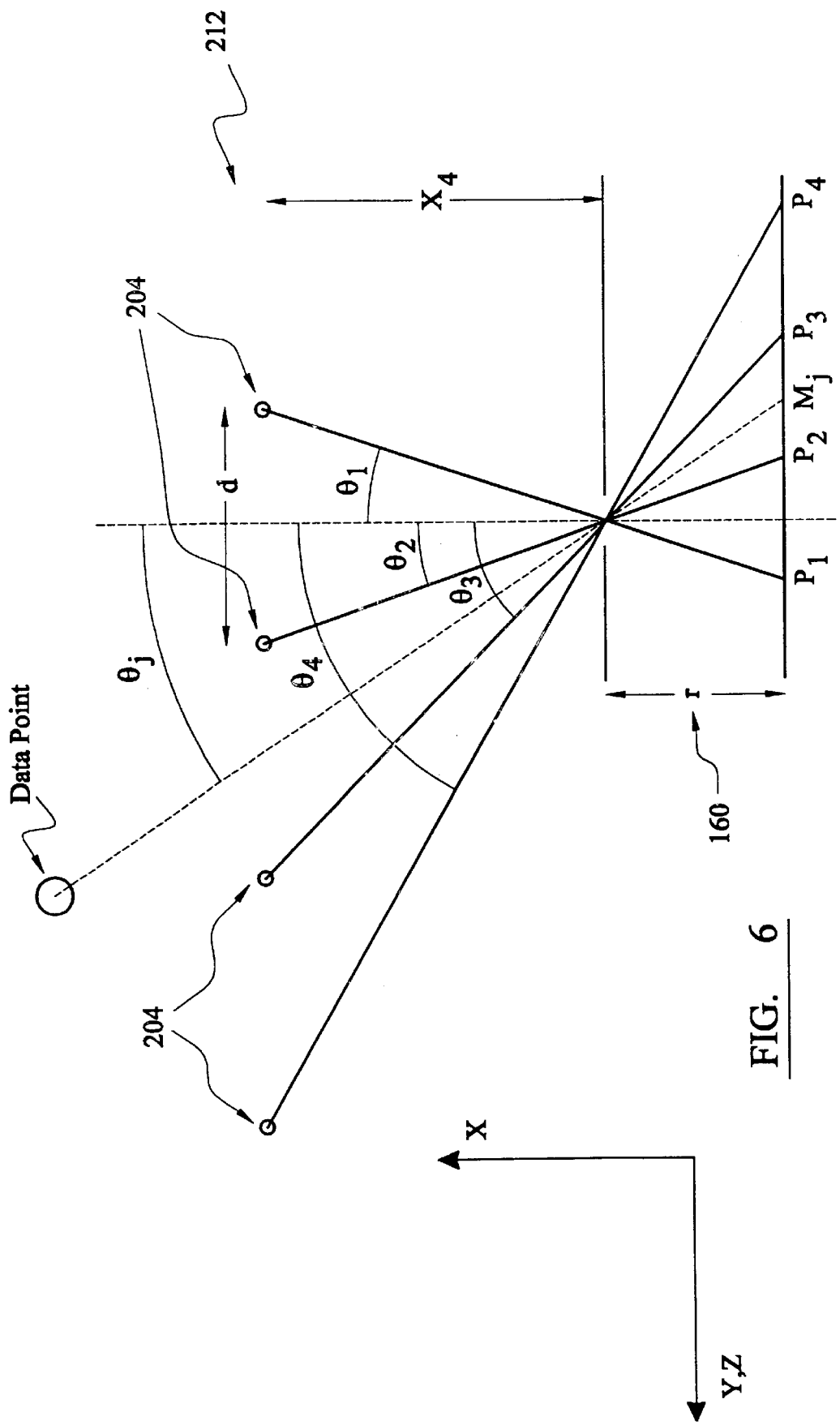

Camera units A and C will each have a calibration comprising pixel coordinated data for each row of LEDs while camera unit B will have pixel/angle coordinates for each column. This allows calculation of a given angle from a pixel value using linear interpolation (see FIG. 6). Thus, if an image is formed at the $i^{th}$ point, which lies somewhere between the $j^{th}$ and the $j+1^{th}$ calibration points, then the image angle $\theta_i$ is given by Equation (7) herewith, where $P_j$ denotes the pixel location of the $j^{th}$ calibration point and $M_j$ is the pixel location of the data point.

$$\theta_i = \theta_j + \left\{ \left( \frac{m_j}{p_{j+1}} - \frac{p_j}{p_j} \right) (\theta_{j+1} - \theta_j) \right\} \quad (7)$$

The x, y, z coordinates can then be calculated from the equations for the intersections of the three planes in accordance with Equations 8, 9 and 10 herewith, where $\theta_A$ $\theta_B$ and $\theta_C$ are the angles subtended by the LEDs with respect to the camera unit origins and 2D is the separation of the camera units A and C.

$$y = \frac{2D}{1 + \frac{\tan \theta_A}{\tan \theta_C}} \quad (8)$$

$$x = y \tan \theta_A \quad (9)$$

$$z = x \tan \theta_B \quad (10)$$

It should be noted that in an ideal design any movement in the z plane alone should not change the positions of the centroids on the camera units A and C. In reality, mechanical tolerances can rotate the slit which results in a translation of the centroid without a change in the y coordinate. If the effect is large then a second calibration axis may be required so that a 2-dimensional relationship is established between the centroid and the angle of view.

What is claimed is:

1. Apparatus for calibration of a 3-dimensional coordinate determination system comprising:
    transmitting apparatus for emitting energy signals,
    receiving apparatus for receiving energy signals, and
    a processor coupled to the transmitting apparatus and to the receiving apparatus for evaluating transmitted energy signals,
    one of the transmitting apparatus and the receiving apparatus including plural elements respectively disposed at known locations in at least two spaced-apart mounting planes,
    the other of the transmitting apparatus and the receiving apparatus being disposed at known distances from and attitudes with respect to the known locations so as to enable effective transmission of energy signals between the transmitting apparatus and the receiving apparatus for calibration purposes.

2. The apparatus of claim 1, wherein the at least one of the transmitting apparatus and the receiving apparatus is the transmitting apparatus and includes plural transmitters.

3. The apparatus of claim 2, wherein each of the plural transmitters is a light-emitting diode.

4. The apparatus of claim 3, wherein the receiving apparatus includes a camera.

5. The apparatus of claim 4, wherein the camera includes plural camera units each including an optical sensing module.

6. A method of calibrating a 3-dimensional coordinate determination system comprising:
    providing a transmitting apparatus and a receiving apparatus at least one of which includes plural elements,
    mounting the plural elements of the at least one of the transmitting and receiving apparatuses at known locations in plural spaced-apart mounting planes,
    disposing the other of the transmitting and receiving apparatuses at one or more fixed locations at known distances from and attitudes with respect to the known locations,
    causing the effective transmission of energy signals between the transmitting apparatus and the receiving apparatus, and
    evaluating the transmitted energy signals for calibration purposes.

7. The method of claim 6, wherein the mounting includes mounting plural transmitters of the transmitting apparatus.

8. The method of claim 7, wherein the energy transmission includes transmission of optical energy.

9. The method of claim 8, wherein the disposing includes disposing a camera at the fixed locations.

10. The method of claim 9, wherein the disposing includes disposing plural optical sensors of the camera respectively at fixed locations.

11. Apparatus for calibration of a 3-dimensional coordinate determination system comprising:
    first communication apparatus mounted on a first mounting structure at a first predetermined location,
    second communication apparatus mounted on a second mounting structure at a second predetermined location a known distance from the first location, and
    third communication apparatus mounted on a third mounting structure at a third predetermined location disposed between the first and second locations at known distances from each,
    each of the communication apparatuses being capable of transmitting or receiving energy signals,
    the communication apparatuses being arranged for transmitting energy signals between the first and second communication apparatuses and between the first and third communication apparatuses,
    the third mounting structure having a window therein to permit an uninterrupted transmission of energy signals between the first and second communication apparatuses.

12. The apparatus of claim 11, wherein the communication apparatuses are optical apparatuses.

13. The apparatus of claim 11, wherein the first communication apparatus is a receiving apparatus and the second and third communication apparatuses are transmitting apparatuses.

14. The apparatus of claim 13, wherein the receiving apparatus includes a camera and each of the transmitting apparatuses includes a light source.

15. The apparatus of claim 14, wherein each of the transmitting apparatuses includes plural light-emitting diodes and the camera includes plural optical sensing units.

16. The apparatus of claim 11, wherein each of the second and third mounting structures includes a plate defining a mounting plane in which the associated communication apparatus is mounted.

17. The apparatus of claim 16, and further comprising bracing structure interconnecting the first and second mounting structures for minimizing relative movement thereof.

18. The apparatus of claim 11, wherein the window includes at least one aperture in the third mounting structure.

19. The apparatus of claim 18, wherein the window includes an array of apertures in the third mounting structure.

20. A method for calibrating a 3-dimensional coordinate determination system comprising:
    mounting a first communication apparatus on a first mounting structure at a first predetermined location,
    mounting a second communication apparatus on a second mounting structure at a second predetermined location a known distance from the first location, and mounting a third communication apparatus on a third mounting structure at a third predetermined location disposed between the first and second locations at known distances from each, transmitting energy signals between the first and second communication apparatuses and between the first and third communication apparatuses, and providing a window in the third mounting structure to permit an uninterrupted transmission of energy signals between the first and second communication apparatuses.

21. The method of claim 20, wherein the transmitting includes transmitting signals from each of the second and third communication apparatuses to the first communication apparatus.

22. The method of claim 21, wherein the transmitting includes transmitting optical signals.

23. The method of claim 22, wherein each of the second and third communication apparatuses includes plural light sources, the mounting including mounting the plural light sources respectively at different positions in each of the first and second locations.

24. The method of claim 20, wherein the transmitting includes the transmission of optical signals.

25. The method of claim 20, wherein each of the second and third mounting structures includes a mounting plane, the mounting steps include mounting the second and third communication apparatuses in the mounting planes.

* * * * *